United States Patent [19]

Oakley et al.

[11] Patent Number: 4,626,401

[45] Date of Patent: Dec. 2, 1986

[54] APPARATUS FOR INSPECTING FUEL ELEMENTS

[75] Inventors: David J. Oakley, Richland; Oliver J. Groves, Seattle, both of Wash.; Bruce J. Kaiser, Wilmington, N.C.

[73] Assignee: The United States of America as represented by the United States Department of Energy, Washington, D.C.

[21] Appl. No.: 685,081

[22] Filed: Dec. 21, 1984

[51] Int. Cl.⁴ .............................................. G21C 17/00
[52] U.S. Cl. ................................... 376/245; 376/251; 376/253; 250/374
[58] Field of Search ............... 250/370 A, 370 B, 374, 250/336.1; 376/245, 251, 253

[56] References Cited

U.S. PATENT DOCUMENTS 3,679,877 7/1972 Weiner et al. ...................... 250/370
4,527,064 7/1985 Anderson ............................ 250/374

OTHER PUBLICATIONS

"Nuclear Radiation Detection", 2nd Ed, Price (1964), pp. 151-155.

Primary Examiner—Salvatore Cangialosi
Attorney, Agent, or Firm—Edward W. Nypaver; Robert Southworth, III; Judson R. Hightower

[57] ABSTRACT

Disclosed is an alpha monitor usable in an automated nuclear fuel pin loading and processing unit. Fuel pins or other elongated pins are fed laterally into the alpha monitor in a singular fashion and are translated by a first roller assembly into a weld flare machining and decontamination substation not forming a part of the invention. Pins return and are lifted upwardly and transferred across to a combined pin lifting and electrode operating means which lifts the pins upwardly into a clamshell electrode assembly which is spread open by a combined pin lifting and electrode operating means. Once inserted the clamshell type electrode arrangement closes around the fuel pins so that inspection can occur. Fuel pins are inspected by charging electrodes to a negative potential and measuring the change in charge occurring when positively charged alpha particles strike the negatively charged electrodes. After inspection, the fuel pins are lowered by the pin lifting and electrode operating means into a second roller assembly which longitudinally conveys approved pins from the airtight enclosure in which the alpha monitor is mounted. If the fuel pins are rejected then they are moved laterally by a second transfer means and onto another system for further processing.

16 Claims, 21 Drawing Figures

APPARATUS FOR INSPECTING FUEL ELEMENTS

The United States Government has rights in this invention pursuant to Contract No. DE-AC06-76FF02170 between the U.S. Department of Energy and Westinghouse Hanford Co.

TECHNICAL FIELD

The technical field of this invention includes apparatus for inspecting the exterior surfaces of elongated pins such as nuclear fuel pins, to detect the emission of alpha particles from contaminants present on the exterior surfaces.

BACKGROUND OF THE INVENTION

Nuclear reactors are fueled by radioactive materials which are compressed into pellets and installed within tubular nuclear fuel pin casings. The fuel pin casings are then plugged at the open end and sealed by welding. The completed nuclear fuel pins are assembled into bundles and the bundles are arranged within a nuclear reactor in specific configurations dependent upon the particular nuclear reactor design.

The physics of liquid metal cooled breeder reactors involves using fuel pellets containing plutonium oxide in combination with uranium oxide. The plutonium oxides used are highly toxic to humans aside from being radioactive in nature. It is therefore desirable to completely automate the production of such nuclear fuel pins so that the assembly process can occur within tightly enclosed systems and without any direct human contact.

SUMMARY OF THE INVENTION

The current invention was developed as one specific component in an overall system for automated manufacturing of nuclear fuel pins. The overall system uses previously prepared plutonium and uranium oxide fuels and installs these fuels into previously manufactured nuclear fuel pin casings. The fuel pins are then automatically capped, welded, cleaned and inspected. The invention deals with handling and inspecting the fuel pins to determine whether any radioactive materials are present on the exterior of the fuel pin prior to sending them from the system. The inspection monitor functions by detecting emissions of positively charged alpha particles from radioactive fuel present on the exterior surfaces of the fuel pins.

It is an object of this invention to provide a fuel pin inspection apparatus which receives and handles elongated pins, and which inspects the pins for the presence of contaminating radioactive material on the exterior surfaces thereof.

It is an object of the invention for the inspection apparatus to automatically discriminate between the contaminated and uncontaminated fuel pins and to accordingly convey uncontaminated fuel pins from the system while retaining contaminated fuel pins within the system for other treatment.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects in accordance with the purpose of the present invention, as embodied and broadly described herein, the alpha partial inspection apparatus of this invention may comprise a structural framework having an electrode assembly mounted thereon. The electrode assembly comprises an electrode casing or casings having an electrode or electrode means attached thereto. Nuclear fuel pins or other elongated pins being inspected are singularly fed into or adjacent to the electrode assembly for inspection. If radioactive contaminants are present on the surfaces of the fuel pins, then the contaminants will emit alpha particles. The alpha particles are positively charged and are electrically attracted to the electrodes which are maintained at a negative potential. Charge measuring apparatus well known in the art are advantageously connected to the electrode means and any change in the charge existing on the electrodes is detected and interpreted as an indication that the fuel pin surface is contaminated.

BRIEF DESCRIPTION OF THE DRAWINGS

A preferred embodiment of this invention is illustrated in the accompanying drawings, in which:

FIGS. 3A and 3B are cross-sectional views taken along line 3—3 of FIG. 2A; FIG. 3A shows the pin lifting mechanism in a lowered position and FIG. 3B shows the pin lifting mechanism raised for inspection of a fuel pin within an electrode assembly;

FIG. 3C is a partial view similar to FIGS. 3A and 3B showing how the pin lifting mechanism forces the electrode assembly open;

FIG. 4A is a partial top view of the lower part of the alpha monitor internal assembly taken along line 4A—4A of FIG. 2A; FIG. 4A does not show the entire front half as is shown in FIG. 2A;

FIG. 4B is a top view taken along line 4B—4B of FIG. 2B; FIG. 4B does not show the entire rear half of the alpha monitor internal assembly as is shown in FIG. 2B;

DETAILED DESCRIPTION OF THE PREFERRED EMBODIMENT

Figure 1:
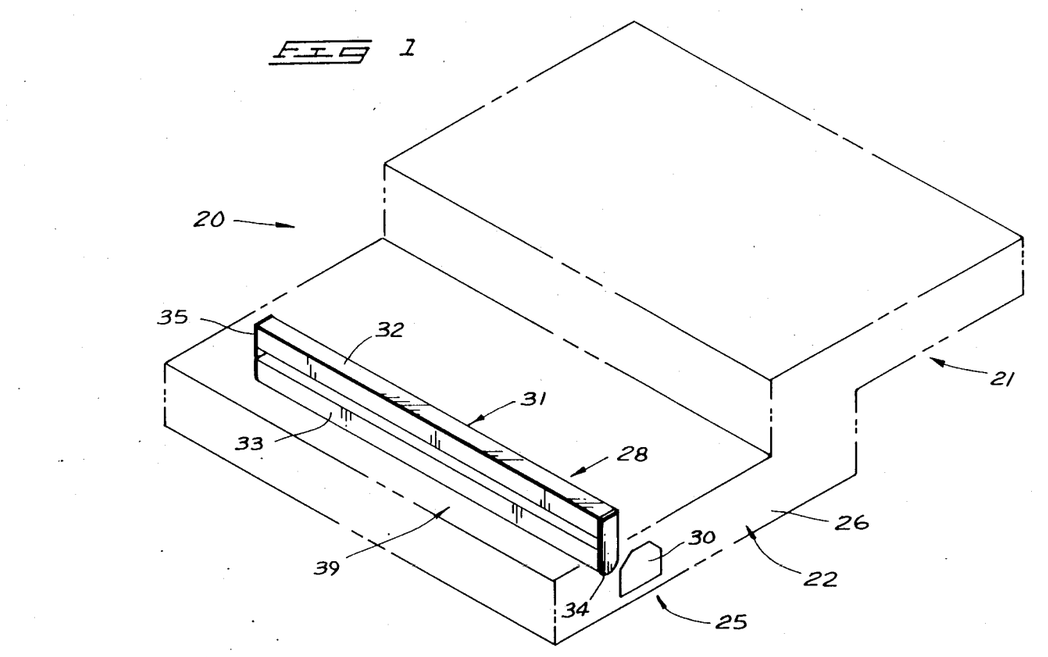
FIG. 1 is an isometric view of the overall system (shown in phantom) and the alpha monitor forming a part thereof shown in schematic form.

FIG. 1 shows a diagrammatic representation of an overall fuel pin loading and processing unit 20. Processing unit 20 has an upper ramp portion 21 and a lower ramp portion 22. Nuclear fuel pellets (not shown) are loaded into nuclear fuel pin casings in the upper ramp portion 21. The resulting nuclear fuel pins 23 (shown in FIG. 5) roll transversely within the upper ramp portion 21 toward lower ramp 22. A vacuum degassification unit (not shown) removes the fuel pins longitudinally and transfers them to lower ramp 22 after removing nitrogen from the fuel pellets. In lower ramp 22 the fuel pin casings are sealed using a plug (not shown) which is welded to the pin casings using a pulsed magnetic welding system (not shown). After welding, the fuel pins 23 are machined in order to remove surface roughness resulting from the pulsed magnetic welding.

The above steps performed by the fuel pin loading and processing unit 20 are not directly related to the current invention which is a component in the overall system. FIG. 1 shows the approximate positioning of an alpha monitor 25 within the overall processing unit 20. Alpha monitor 25 is mounted in lower ramp portion 22 which is defined by a lower ramp containment enclosure 26 which is of airtight construction. The atmosphere within the lower ramp containment enclosure 26 is relatively pure helium as dictated by the processing steps which occur within the lower ramp portion 22 and the desired atmosphere inside the finished fuel pins.

Figure 5:
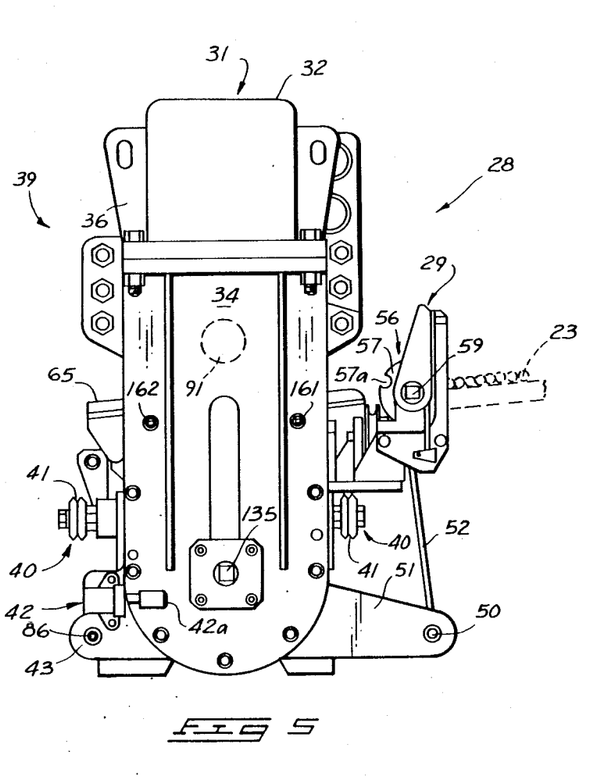
FIG. 5 is a front end view of the alpha monitor internal assembly shown in FIG. 2A.

FIG. 1 shows that elongated nuclear fuel pins approach the alpha monitor from the entry side 28 of the alpha monitor. The fuel pins preferably roll up to the entry side of alpha monitor 25 and are stopped against a means for singularly accepting the fuel pins 56 (see FIG. 3A). An incoming fuel pin alignment means 29 is illustrated in FIG. 5 for endwise alignment of the incoming fuel pins 23.

FIG. 1 also shows that alpha monitor 25 has two major parts. The first part is the alpha monitor cover plate assembly 30 which mounts upon the exterior of airtight containment enclosure 26. The second major part of the alpha monitor is the internal assembly 31.

Internal assembly 31 extends longitudinally across the lower ramp portion 22 but within enclosure 26. Internal assembly 31 includes a structural framework having an upper beam 32 and a lower beam 33. Upper and lower beams 32 and 33 are connected together by front and rear end pieces or plates 34 and 35, respectively. The length of upper and lower beams 32 and 33 define a longitudinal direction.

Upper beam 32 is positioned above and spaced apart from lower beam 33 thereby allowing nuclear fuel pins 23 to be conveyed laterally across the alpha monitor between the upper and lower beams. The disapproved or rejected fuel pins proceed fully across the alpha monitor internal assembly 31. The approved nuclear fuel pins discharge through cover plate assembly 30 in an endwise motion and onto an adjacent associated system (not shown) for containerizing the fuel pins for shipment.

Figure 2A:
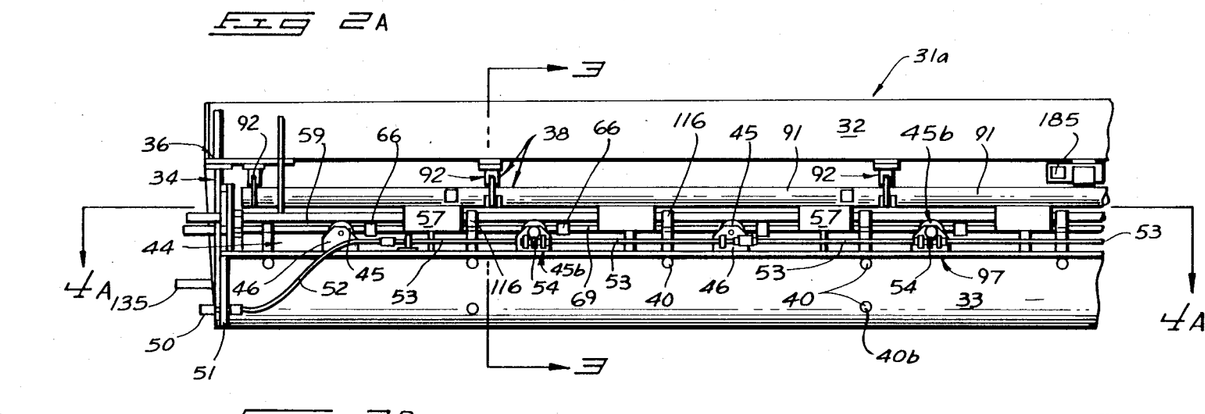
FIG. 2A is a partial side elevational view showing approximately the front half of the preferred embodiment of the alpha monitor internal assembly.
Figure 2B:
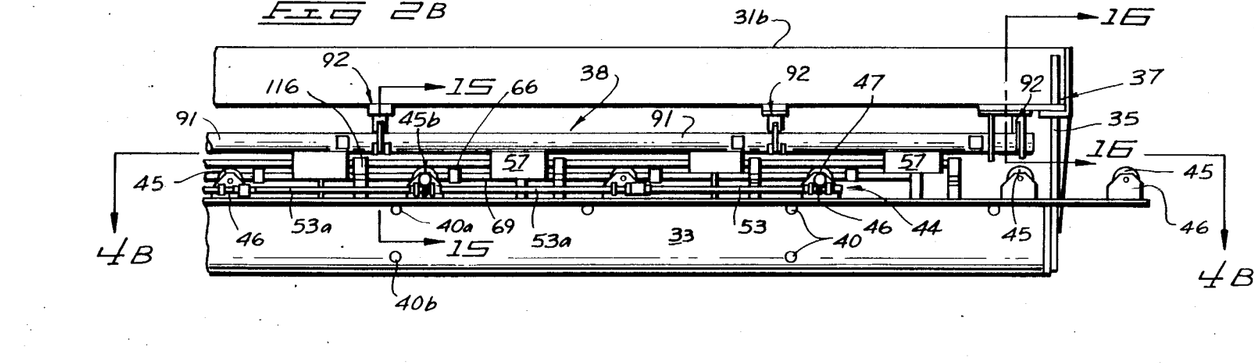
FIG. 2B is a partial side elevational view showing approximately the rear half of the preferred embodiment of the alpha monitor internal assembly.
Figure 6:
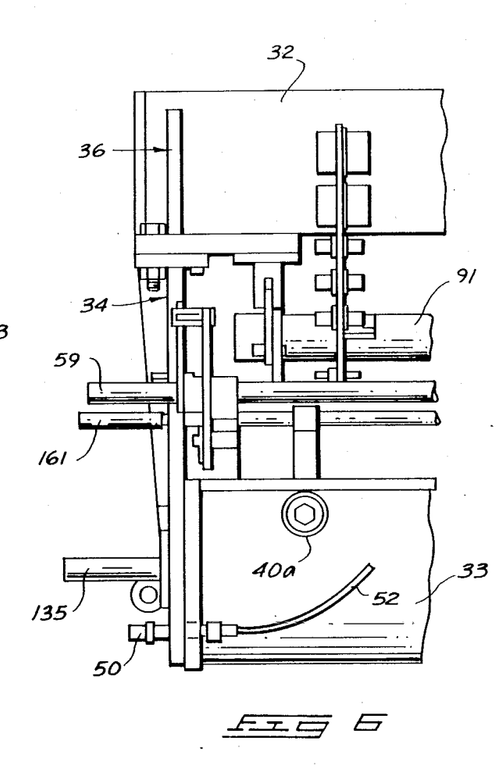
FIG. 6 is an enlarged partial side elevational view of the front end of the alpha monitor internal assembly.

FIGS. 2A and 2B show the alpha monitor internal assembly 31 in side elevational view and in greater detail than shown in FIG. 1. Internal assembly 31 is divided for purposes of illustration into an approximately front half portion 31a shown in FIG. 2A and an approximately rear half portion 31b which is shown in FIG. 2B. FIGS. 2A and 2B display the over/under relationship existing between upper beam 32 and lower beam 33. FIG. 2A shows the front end plate 34 which is connected to the upper beam 32 using upper beam front flange piece 36 (see also FIG. 6). Similarly rear end plate 35 is connected to the rear end of beam 32 using the upper beam rear flange piece 37. Upper beam 32 is preferably connected to the front and rear end plates 34 and 35 using a bolted connection thereby allowing alpha monitor internal assembly 31 to be disassembled for maintenance.

FIGS. 2A and 2B also show an electrode assembly 38 which extends longitudinally beneath upper beam 32 and is connected thereto. The electrode assembly is mounted beneath upper beam 32 to allow individual fuel pins to be inserted upwardly thereinto during the inspection process. The fuel pins can then be lowered downwardly and proceed either out through cover plate assembly 30 at the front end of the alpha monitor or laterally out the outlet side 39 (see FIG. 1).

FIGS. 2A and 2B show an alpha monitor rollable mounting means which includes a plurality of mounting rollers 40 rotatably mounted along the entry side 28 of lower beam 33. Mounting rollers 40 are also similarly mounted upon the outlet side 39 of lower beam 33. Mounting rollers 40 interact with mounting rails (not shown) which are securely fixed within the lower ramp portion of processing unit 20. The upper row of mounting rollers 40a generally support the weight of the internal assembly. Lower mounting rollers 40b allow the internal assembly to be cantilevered upon the mounting rails during installation and removal of the internal assembly from the containment enclosure 26. FIG. 5 shows mounting rollers 40 including the preferred circumferential grooves 41 which allow the alpha monitor to be more exactly positioned upon the mounting rails thereby preventing lateral movement and/or nonalignment of the internal assembly within enclosure 26.

FIG. 5 shows an internal assembly locking means 42 mounted on an extension piece 43 which is attached to lower beam 33. Locking means 42 has a movable release 42a which allows the longitudinal position of the alpha monitor internal assembly 31 to be releasably locked in place when properly positioned within enclosure 26. Locking means 42 is released when the internal assembly 31 is being removed for maintenance.

FIGS. 2A and 2B show a first roller assembly 44. First roller assembly 44 comprises a plurality of first rollers 45 which are pivotally mounted to lower beam 33 using an equal number of roller brackets 46. First roller assembly 44 is provided with idler rollers 45a and power driven rollers 45b. Power driven rollers 45b are positioned at points along the internal assembly to provide force to move fuel pins 23 (see FIG. 5) therealong. Power driven rollers 45b are powered by a first roller assembly motor 48 (see FIG. 7) which is mounted outside of enclosure 26 on cover plate assembly 30. Power is conveyed through a motor coupling 49 (see FIG. 8) which interengages with a shaft end 50 (FIG. 2A) which is rotatably mounted to extension piece 51 mounted on the entry side of lower beam 33 (FIG. 5). Shaft end 50 is connected by a flexible shaft section 52 to a first roller drive shaft assembly 53. First roller drive shaft assembly 53 is comprised of a plurality of drive shaft segments or a single shaft. The shaft or shaft segments are rotatably mounted adjacent the first roller brackets 46 of power driven rollers 45b. Driving helical gears 54 (FIG. 2A) are mounted upon roller drive shaft 53 to drive a driven helical gear 55 (FIG. 3A) which is nonrotatably connected with power driven rollers 45b to thereby power drive them.

A first roller assembly drive means comprises motor 48, coupling 49, shaft end 50, flexible shaft 52, driver shafts 53 and helical gears 54 and 55 for rotating rollers 45b to drive nuclear fuel pins 23 rearwardly from the alpha monitor.

First roller assembly 44 is used to longitudinally translate fuel pins 23 endwise so that the fuel pins can be machined to remove welding flares which occur due to the pulsed magnetic welding process which occurs within lower ramp portion 22 of processing unit 20 prior to inspection in the alpha monitor 25. The machined nuclear fuel pins are cleaned to decontaminate them before returning in a reverse direction on the same first roller assembly 44.

Figures 3A, 3C:
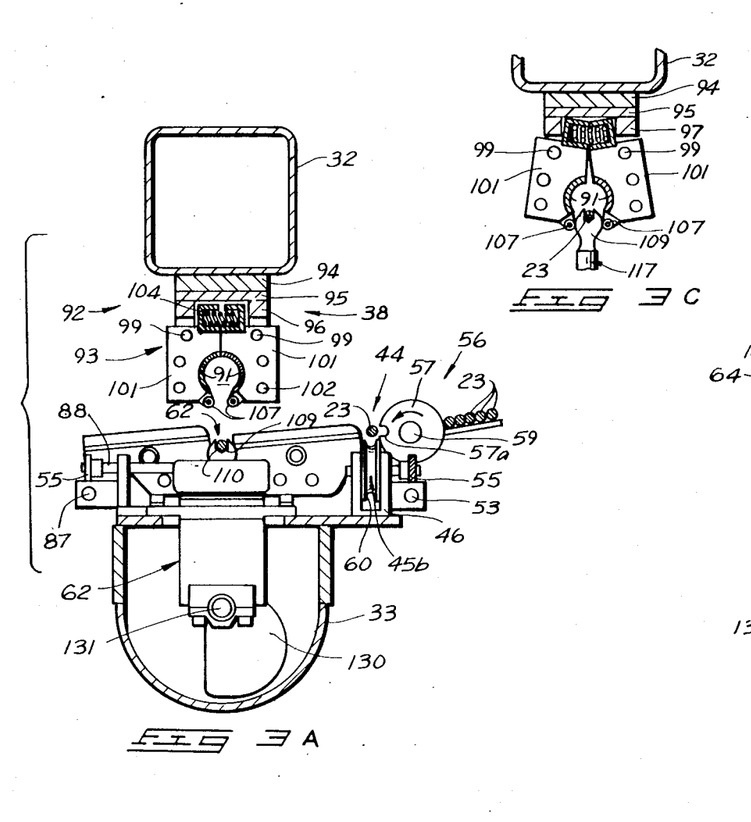
Figure 3B:
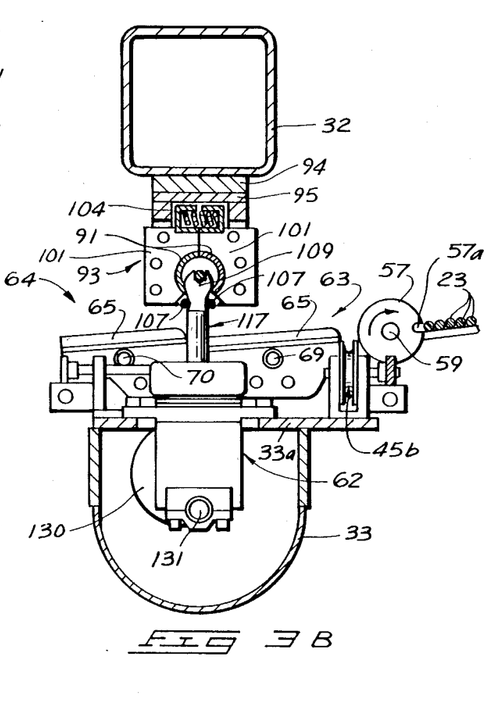
Figure 4A:
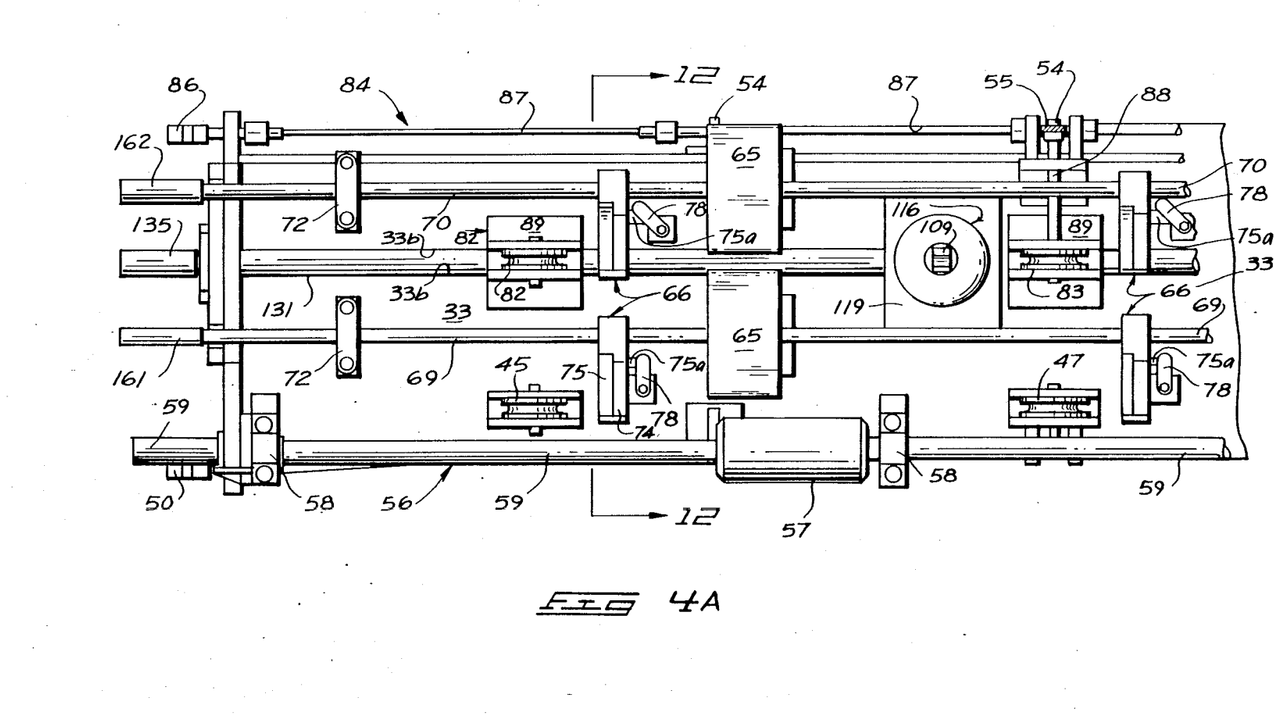
Figure 4B:
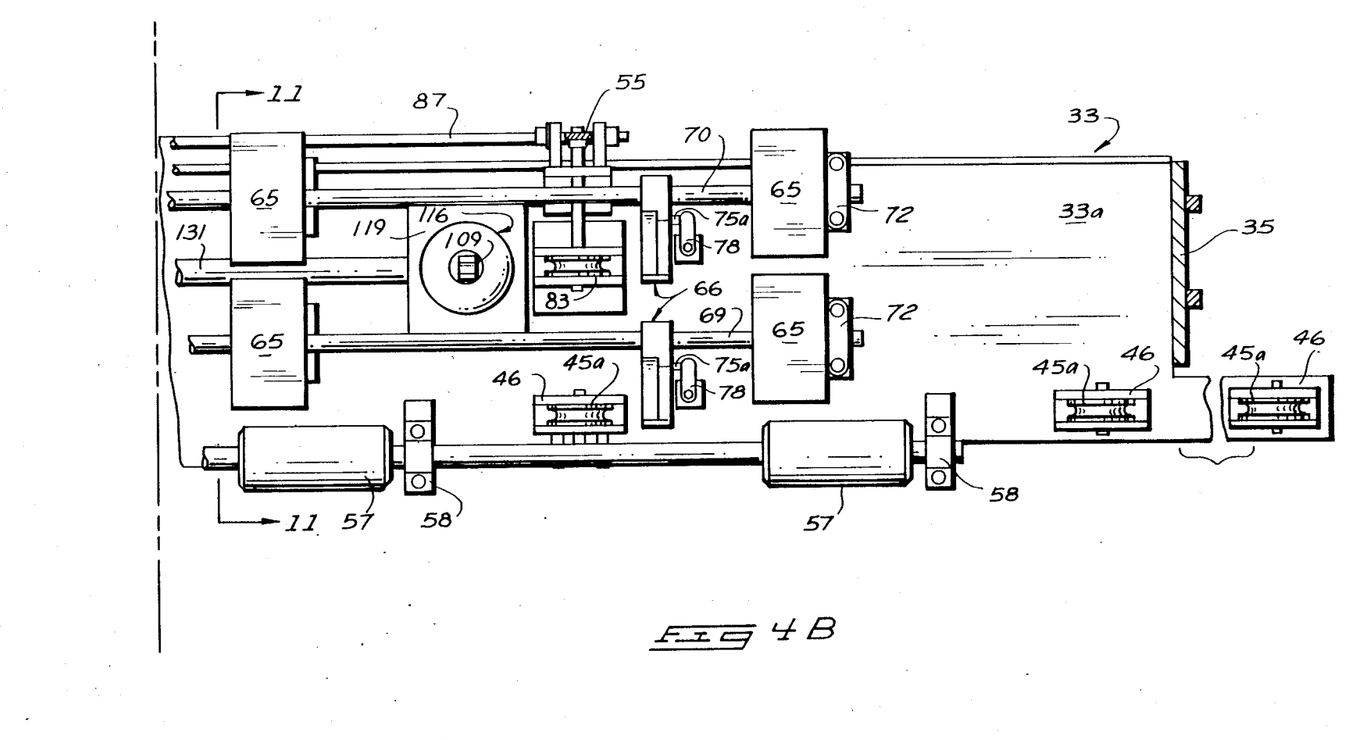

FIGS. 3A and 3B show in cross-sectional view how the incoming fuel pins 23 are initially loaded onto the first roller assembly 44. Rollers 45a and 45b are shown with a peripheral groove 60 which is shaped semicircularly to receive cylindrical nuclear fuel pins 23. Fuel pins 23 are stored adjacent to a means for singularly accepting the fuel pins. The means for singularly accepting fuel pins is preferably a singulator assembly 56 which comprises a plurality of singulator cylinders 57 which are pivotally mounted upon lower beam 33 using singulator pillow blocks 58 (FIGS. 4A and 4B). Singulator cylinders 57 are mounted upon a singulator shaft or shafts 59 which extend along the length of the alpha monitor internal assembly 31.

Returning to FIGS. 3A and 3B, the singulator cylinders 57 can rotate between the discharge position shown in FIG. 3A and the receiving position shown in FIG. 3B. In the receiving position shown in FIG. 3B, cylindrical fuel pins 23 are received within the singulator receiving slots 57a. Receiving slots 57a are sized to allow only one fuel pin 23 to roll thereinto. Singulator cylinders 57 are then rotated by shaft 59 in a counterclockwise direction into the discharge position shown in FIG. 3A. In the discharge position the receiving slots 57a are approximately 5° below horizontal thereby causing the contained fuel pin to roll from slots 57a into the peripheral grooves 60 of rollers 45a and 45b.

Figure 11:
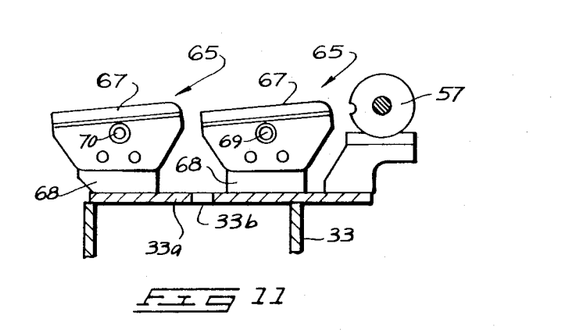
FIG. 11 is a cross-sectional view taken along line 11—11 of FIG. 4B.
Figure 12:
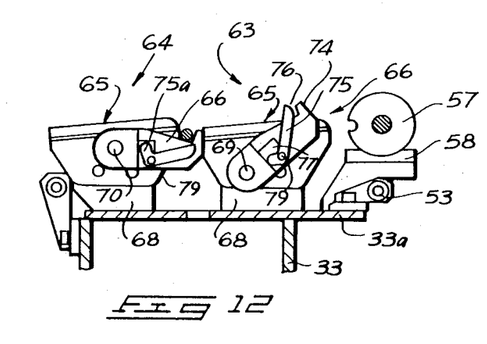
FIG. 12 is a partial cross-sectional view taken along line 12—12 of FIG. 4A.

When the nuclear fuel pin is returned upon roller assembly 44 after decontamination then it is necessary to transfer the fuel pins from the first roller assembly 44 so that the pins can be lifted by a combined fuel pin lifting and electrode operating means 62 (see FIG. 3A). Movement of fuel pins 23 from first roller assembly 44 is accomplished using a first transfer means 63 which is mounted upon lower beam 33. FIG. 12 shows in isolation the important components of first transfer means 63 and a second transfer means 64. Both transfer means are similarly constructed each having a transfer ramp 65 and a lifting arm assembly 66. FIGS. 4A and 4B show that transfer ramps 65 and lifting arm assemblies 66 are not directly connected together, but instead, are spaced at separate locations along the length of lower beam 33. FIG. 11 shows that transfer ramps 65 include an upper surface 67 which is inclined at an angle of approximately 5° to provide the proper velocity when fuel pins 23 roll thereacross. Transfer ramps 65 are mounted on transfer ramp brackets 68 which are connected to the top 33a of lower beam 33.

FIGS. 3A and 12 indicate that a fuel pin lying in peripheral groove 60 of rollers 45a and 45b must be removed by lifting it upwardly using lifting arm assemblies 66. Lifting arm assemblies 66 are pivotally mounted with respect to lower beam 33 using first and second lifting arm shafts 69 and 70. Shafts 69 and 70 are pivotally mounted to the lower beam 33 using lifting arm shaft pillow blocks 72 (FIG. 4A).

FIG. 12 shows that lifting arm assemblies 66 include a lifting arm 74 and a pin kicker 75 which is pivotally connected to lifting arm 74 at pivot pin 79. Lifting arms 74 include a notched upper surface 76 for allowing the fuel pins 23 to rest therein as they are lifted upwardly as the lifting arms pivot with shafts 69 and 70. Lifting arm assemblies 66 pivot counterclockwise as seen in FIG. 12 to raise fuel pins 23 upwardly and onto the upper surface of transfer ramp 65. Pin kickers 75 are used to assure that fuel pins 23 start to roll down ramps 65 after properly being elevated by the lifting arms.

Pin kickers 75 operate by being pivotally attached to the lifting arms 74 and having an extension tail 75a which can be most clearly seen in FIG. 4A. Pin kicker tails 75a extend through apertures 77 in lifting arms 74 (see FIG. 12) and beneath pin kicker stops 78 (see FIG. 4A). As lifting arms 74 are raised, the pin kicker tails 75a engage with stops 78 thereby causing the pin kickers to pivot about pivot pins 79 and into the position shown at the right in FIG. 12. The relative pivoting of pin kickers 75 provides the impetus to assure that fuel pins 23 will begin rolling across the transfer ramps 65.

First transfer means 63 lifts fuel pins from first roller assembly 44 and transfers them preferably to a second roller assembly 80 for lifting therefrom by the combined fuel pin lifting and electrode operating means 62 (FIG. 3A). In the preferred embodiment the second roller assembly 80 is aligned with the pin lifting and electrode operating means 62. Pins 23 preferably roll from the first transfer means ramps 65 and drop into peripheral grooves in second rollers 82 and 83 of the second roller assembly 80. The second roller assembly is constructed in a fashion similar to the first roller assembly having idler rollers 82 and driven rollers 83 (see FIGS. 4A and 4B). Second roller assembly 80 is driven through a second roller assembly drive means 84 which is very similar to the first roller assembly drive means.

Figure 7:
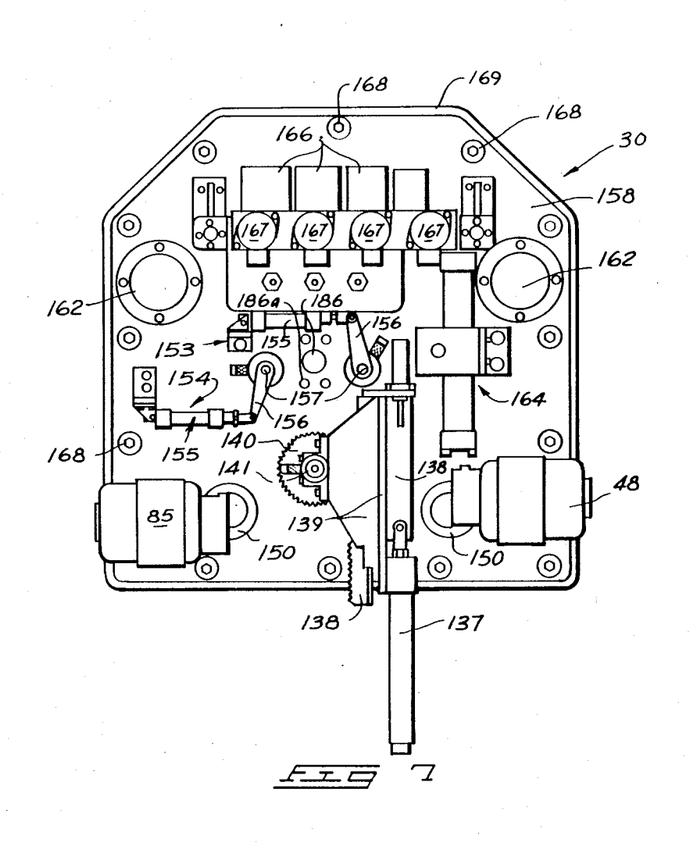
FIG. 7 is a front elevational view of the alpha monitor cover plate assembly also shown in FIG. 1.
Figure 8:
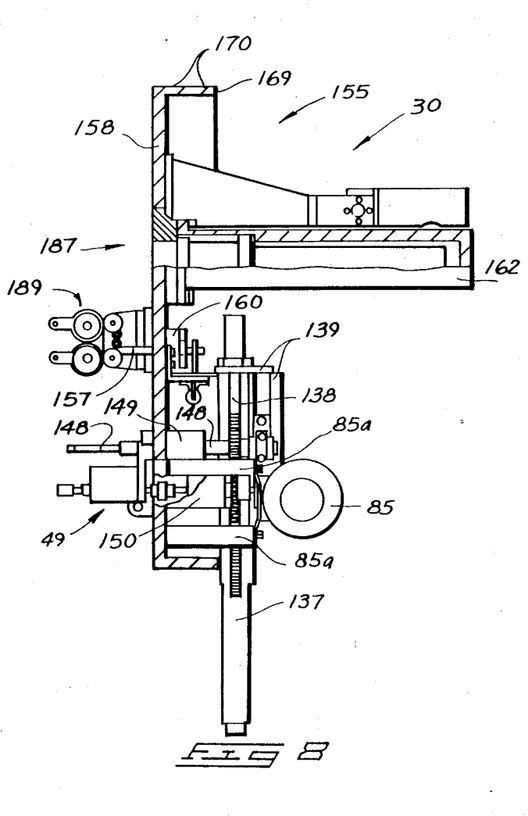
FIG. 8 is a side elevational view of the cover plate assembly shown in FIG. 7, portions have been broken away and shown in cross section.

Second roller assembly drive means 84 includes a second roller assembly motor 85 (see FIG. 7) which drives through a second motor coupling 49 (see FIG. 8). Second motor coupling 49 rotates second roller shaft end 86 (see FIG. 5) which turns second roller assembly drive shafts 87 (see FIG. 4A). Second roller assembly drive shafts 87 are connected to driving helical gears 54 which turn driven helical gears 55. Driven helical gears 55 are connected to a roller connection shaft 88 which are connected to second power driven rollers 83 to thereby turn them. Second rollers 82 and 83 are rotatably mounted using second roller brackets 89.

The second roller assembly drive means rotates the second power driven rollers 83 so as to longitudinally convey fuel pins thereon to discharge the fuel pins through the front cover plate 30 of the alpha monitor.

Prior to discharging the fuel pins using the second roller assembly it is first necessary to perform the important inspection function for which the alpha monitor is designed. This inspection function is based upon the fact that the nuclear fuel pellet materials, specifically plutonium and/or uranium oxides emit positively charged alpha particles which can be detected when they strike a negatively charged electrode. The emission of alpha particles cause a measurable change in the charge existing on electrodes 183 when the particles strike electrodes 183 (see FIG. 17).

Figure 13:
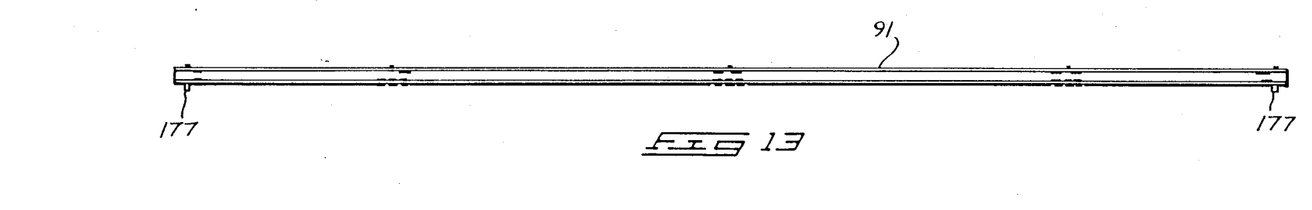
FIG. 13 is a side elevational view of a semicylindrical electrode casing used in the alpha monitor internal assembly shown in FIGS. 2A and 2B.
Figure 14:
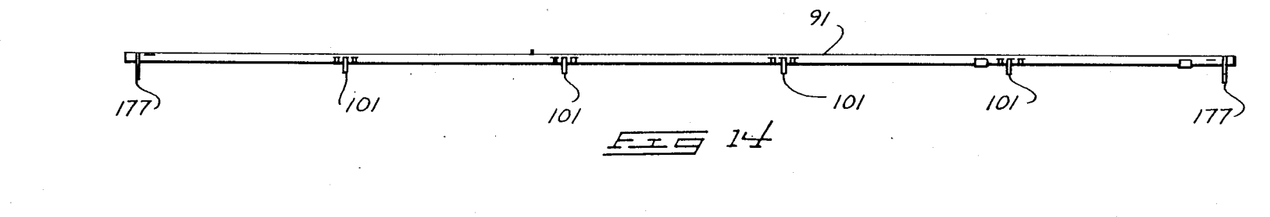
FIG. 14 is a bottom view of the electrode casing shown in FIG. 13.

The electrode assembly 38 is constructed with two approximately semicylindrical tubular electrode casings 91 (see FIGS. 13 and 14). These elongated semicylindrical electrode casings are provided in pairs which extend longitudinally along beneath upper beam 32. The electrode casings 91 are mounted under beam 32 by electrode casing mounting means 92 which are spaced periodically along the length of the alpha monitor internal assembly (see FIGS. 2A and 2B). FIGS. 3A and 3B show the electrode casings 91 mounted by a spring biased electrode mount 93 which forms a part of the overall electrode casing mounting means 92.

Figure 15:
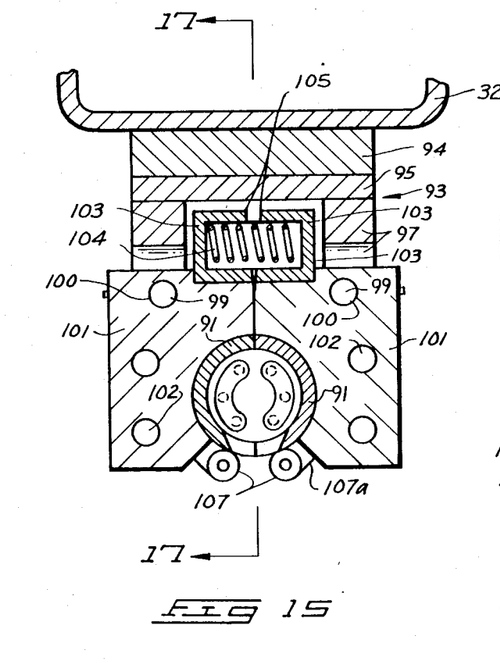
FIG. 15 is a cross-sectional view taken along line 15—15 of FIG. 2B.
Figure 17:
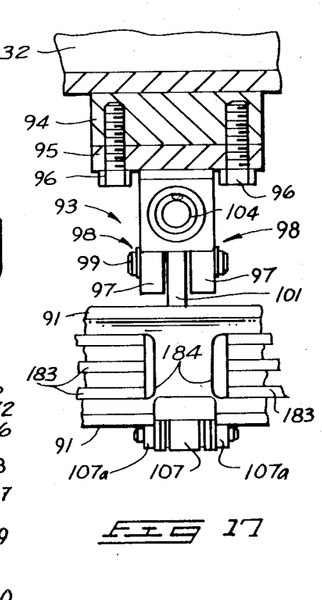
FIG. 17 is a cross-sectional view taken along line 17—17 of FIG. 15.

FIGS. 15 and 17 show the spring biased electrode mount 93 in greater detail. Electrode mount 93 includes a first mounting plate 94 which is welded or otherwise fixed to the underside of upper beam 32. A second mounting plate 95 is attached to the first mounting plate 94 preferably using mounting bolts 96 (FIG. 17). Extension plates 97 are connected to and extend downwardly from second mounting plate 95 and have apertures 98 therein for receiving pivot pins 99. Pivot pins 99 also extend through apertures 100 formed in electrode plates 101. Electrode plates 101 also have a plurality of holes 102 for allowing electrical wiring to be supported therethrough.

Spring casings 103 are rigidly attached to the upper portions of electrode plates 101 to provide an enclosure in which a compression spring 104 is confined. Spring casings 103 are beveled along the opposing faces 105 to allow the electrode plates 101 and attached spring casings 103 to pivot about pivot pins 99 without binding. Spring 104 biases against such motion which is illustrated in FIG. 3C. The spring biased electrode mount 93 also includes a pair of engagement rollers 107 which are rotatably mounted to the electrode casings 91 and electrode plates 101 using brackets 107a.

FIGS. 3A and 3B show combined pin lifting and electrode operating means 62 positioned below engagement rollers 107 of the electrode assembly. The pin lifting and electrode operating means 62 raises pins 23 upwardly and inserts them within the cylindrical area defined by electrode casings 91. The spring biased electrode mounts 93 allow the electrode casings 91 to move in a clamshell motion illustrated in FIG. 3C during insertion of fuel pins into the electrode assembly.

The means for singularly accepting elongate pins 56, the pin lifting and electrode operating means 62, and the first means for transferring singularly accepted elongate pins 63 to the pin lifting and electrode operating means, together form means for singularly positioning elongate pins within electrode assembly 38.

The combined pin lifting and electrode operating means 62 includes a vertically extendable pin lifter 117. Pin lifters 117 have lifting heads 109. The pin lifters and lifting head move between the down position shown in FIG. 3A and the fully extended position shown in FIG. 3B. In the fully extended position shown in FIG. 3B, the lifting head 109 is positioned substantially within the electrode casings 91.

Figure 10:
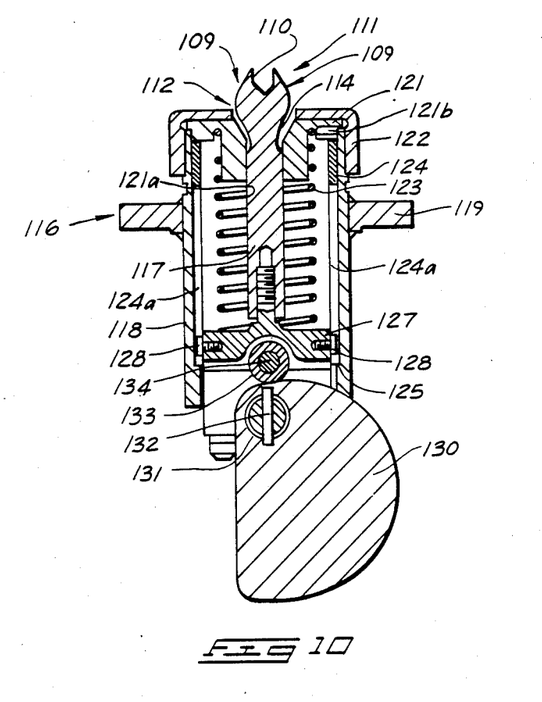
FIG. 10 is a cross-sectional view taken along line 10—10 of FIG. 9.

FIG. 10 shows that lifting head 109 has a pin recess 110 which is sized to properly receive fuel pins 23 therein. Lifting head 109 is also provided with a particular transverse exterior contour or camming profile which is relatively small in width at the distal end 111 and which expands outwardly to an enlarged midsection 112. This enlarged midsection 112 is engaged by rollers 107 to open the electrode assembly into the open position shown in FIG. 3C. Lifting head 109 then tapers in transverse contour down to a waist portion 114 which is properly sized so that the engaging rollers 107 return the electrode assembly to the closed position shown in both FIGS. 3A and 3B.

FIG. 10 also shows a pin lifting unit 116 forming a part of the combined pin lifting and electrode operating means 62. Pin lifting units 116 include the pin lifters 117 and lifting head 109 just described. Pin lifting units 116 also include a lifting unit casing 118 which has a lifting unit flange 119 attached thereto for mounting the lifting unit upon top 33a of lower beam 33.

At the top of lifting unit 116 is a anti-friction guide 121 which is preferably constructed of nylon. Guide 121 has a guide hole 121 which is preferably noncircular to receive a similarly shaped pin lifter 117 thereby preventing rotation of the lifting pin within guide 121. Anti-friction guide 121 is held in place at the top of lifting unit casing 118 by a lifting unit cap 122. An anti-rotation pin 121b is provided to properly align guide 121. Guide 121 also serves as an end piece for the internal compression spring 123.

The inside of lifting unit casing 118 is lined with a anti-friction bushing 124 which has longitudinal slots 124a cut thereinto at each side. Bushing 124 is held in place against shoulder 125 formed on the inside of casing 118 near the bottom thereof. The top of bushing 124 is firmly held when cap 122 is screwed down upon guide 121 which contacts the upper end of bushing 124.

A lifting unit piston 127 is slidably mounted within the inside of anti-friction bushing 124. Piston 127 includes anti-rotation pieces 128 mounted at each side for slidable travel within the longitudinal slots 124a. Piston 127 is oscillated up and down within bushing 124 in response to forces applied by a cam 130.

Cam 130 is mounted upon cam shaft 131 for rotation therewith using an anti-rotation pin 132. A cam follower roller 133 is rotatably mounted upon the bottom of piston 127 by follower shaft 134.

FIG. 10 shows the lifting unit 116 in the down position also shown in FIG. 3A. Pin lifter 117 is longitudinally extended into the extended position shown in FIG. 3B by rotating cam shaft 131 and attached cam 130 in a counterclockwise direction as shown in FIG. 10. In response to this counterclockwise rotation of the cam 130, cam follower 133 rolls over the profile of the cam to lift piston 127, pin lifter 117, and any pin 23 supported in pin recess 110. The pin lifters 117 are moved from the extended position into the down position by rotating the cam and cam shaft in the reverse or clockwise direction. Compression spring 123 or other biasing means biases the pistons into the down position and assures proper return of the pin lifters and piston within the lifting unit.

Figure 9:
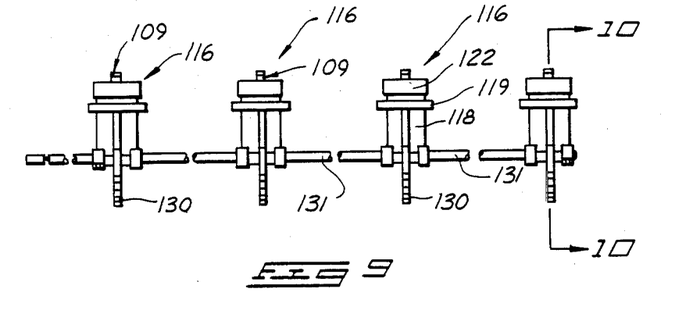
FIG. 9 is a side elevational view of portions of the pin lifting assembly in isolation from the remainder of the alpha monitor, portions have been broken away and removed and the assembly compressed in length.

A plurality of lifting units 116 are connected together by multiple or single cam shafts 131 as illustrated in FIG. 9. FIGS. 4A and 4B also show cam shafts 131 extending between lifting units 116 and terminating at cam shaft connection end 135 at the front end of the internal assembly 31. Cam shafts 131 are shown in FIGS. 4A and 4B because of an elongate slot 33b in top 33a of lower beam 33.

Cam shafts 131 are driven by a pneumatic ram 137 which is best shown in FIGS. 7 and 8. Pneumatic ram 137 forms a part of the combined fuel pin lifting and electrode operating means 62. Pneumatic ram 137 is connected to a gear rack 138 which is slidably mounted upon alpha monitor cover plate assembly 30 using a bracket 139. Gear rack 138 engages a gear 140 which is rotatably mounted on cover plate assembly 30 by gear bearing assembly 141. Gear 140 is connected to coupling shaft 148 which extends through the cover plate assembly and is positioned for engagement with the cam shaft connection end 135. A sealing means 149 prevents leakage about coupling shaft 148. Similar sealing means 150 are also used to prevent leakage about the first and second roller assembly motor couplings 49.

Cover plate assembly 30 also includes first and second lifting arm assembly actuating means 153 and 154 which are mounted on the exterior side 155 of cover plate 158. Actuators 153 and 154 include pneumatic or hydraulic rams 155 which are connected to lever arms 156. Lever arms 156 are connected to shafts 157 which extends through cover plate 158 and are sealed against leakage by sealing means 160 (FIG. 8). Shafts 157 interengage with lifting arm shaft front end pieces 161 and 162 which are connected to first and second lifting arm shafts 69 and 70, respectively.

Cover plate assembly 30 also includes a pair of cover plate slide assemblies 162. Cover plate slide assemblies 162 allow the cover plate assembly to be slid longitudinally away from the enclosure 26 a limited distance without the need for a crane, jack or other support when maintenance is being performed.

Cover plate assembly 30 also includes a singulator actuator 164 which oscillates the singulator assembly 56 in a back and forth motion to singularly accept the fuel pins as described above. A plurality of electronic connection jacks 166 are schematically presented in FIG. 7. Solenoid controlled pneumatic valves 167 are also mounted on cover plate assembly 30 in order to control the operation of pneumatic rams 155, 137 and actuator unit 164. Piping or tubing running from pneumatic control valves to rams 155, 137 and unit 164 is not shown in FIG. 7 to reduce confusion.

A plurality of cover plate mounting bolts 168 are arranged about the periphery of cover plate 158 extending therethrough to firmly mount the cover plate assembly 30 upon the exterior of containment enclosure 26. Cover plate 158 is also provided with a peripheral flange 169 which has maintenance grooves 170 (FIG. 8) formed thereinto so that a plastic contamination control sleeve can be snugly affixed about the periphery of the cover plate during maintenance operation requiring removal of cover plate assembly 30.

Cover plate assembly 30 has an interior side 187 which faces inwardly to containment enclosure 26 and covers an alpha monitor opening (not shown). A pinch roller assembly 189 is mounted on interior side 187 for forcing fuel pins 23 outwardly through exit opening 186 (FIG. 7). Mounting holes 186a are provided to mount a pin discharge seal valve assembly (not shown) on the exterior of cover assembly 30 to prevent leakage of gases from enclosure 26.

Figure 16:
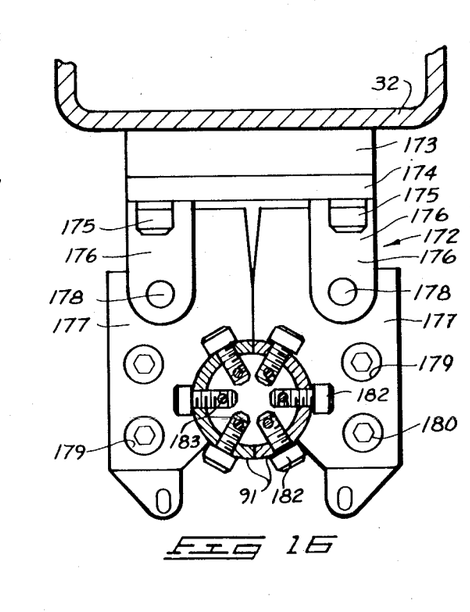
FIG. 16 is a cross-sectional view taken along line 16—16 of FIG. 2B.

In addition to the spring biased electrode mount 93 there is also an unbiased electrode mount 172 which is shown in FIG. 16. Unbiased electrode mount 172 is connected to upper beam 32 by first connection plate 173 which is preferably welded to the upper beam 32. A second connection plate 174 is preferably bolted to first connection plate 173 using bolts 175. Rigidly attached to the second connection plate 174 are depending pieces 176. Electrode mounting plates 177 are pivotally connected to depending pieces 176 using pivot 178. Holes 179 are provided in electrode mounting plates 177 and can be furnished with inserts 180 for running electrical wires therethrough.

FIG. 16 shows that semicylindrical electrode casings 91 are closed along the bottom for substantially the full length thereof except where pin lifters 117 extend upwardly into the electrode assembly.

FIG. 16 shows a plurality of electrode connection pins 182 which position electrodes 183 at appropriate points in a hexagonal pattern. Electrode connections pins 182 also provide electrical connection to the electrodes 183.

FIG. 17 shows that electrodes 183 are terminated by electrode end pieces 184 adjacent to the spring biased electrode mounts 93. Electrodes 183 are accordingly subdivided into sectors for which individual excitation voltages are supplied and for which independent charge measurements are taken. This sectionalization of electrodes 183 allow the nuclear fuel pins 23 to be more accurately diagnosed for leakage or contamination at specific points along the length of the fuel pins.

The manner of using the invention will now be more fully described. FIG. 5 shows a front end view of the alpha monitor internal assembly 31. Fuel pins enter from the entry side 28 and are stopped by singulator cylinders 57 and aligned by incoming fuel pin alignment means 29. Singulator assembly 56 oscillates back and forth powered by the singulator actuator means 164. Individual fuel pins 23 are received and lifted by singulator cylinders 57 within pin recesses 57a. FIG. 3A shows that singulator cylinders 57 rotate counterclockwise until the singulator pin recesses 57a are slightly below horizontal. Fuel pins 23 then roll from recesses 57a and into the peripheral groove 60 of first rollers 45a and 45b.

The fuel pins 23 are then conveyed longitudinally from the rear end of the alpha monitor internal assembly and into a decontamination and weld removal station which is not a part of this invention. The fuel pins 23 return via reverse operation of the first roller assembly 44 and are lifted upwardly from the peripheral grooves of the first rollers 45 using the first transfer means 63. First transfer means 63 lifts the fuel pins 23 from rollers 45 using lifting arm assemblies 66 forming a part of the first transfer means 63. Fuel pins are assured of rolling motion by a pin kicker 75 mounted on the lifting arm assembly 66.

Fuel pins then roll across first transfer ramps 65 and onto a second roller assembly 80. Fuel pins 23 are then lifted upwardly by the combined fuel pin lifting and electrode operating means 62 which simultaneously lifts the fuel pin and separates the electrode assembly casings 91 in a clamshell motion about pivots 99 and 178. With the fuel pin properly inserted at approximately the center line of the cylindrical electrode casing pair 91, inspection then begins.

Inspection is conducted by first negatively charging the electrodes 183 to approximately a negative 200 volt potential. A charge measuring electronic system is then used to detect changes in the charge existing on the electrode segments thereby indicating the number of alpha particles which have struck the electrodes 183 and changed the charge existing thereon.

A gas purity monitor 185 (FIG. 2A) is used to continuously monitor the purity of the gas surrounding the alpha monitor. The gas purity monitor 185 uses a known alpha particle emitting source which is positioned within an arrangement of electrodes similar to electrodes 183. The purity of gas can be determined by comparing the rate of change of the charge as a function of the known emissivity of the alpha particles occurring from the known alpha particle source. Increases in contaminating gases such as oxygen or nitrogen will decrease the rate at which the electrodes in the alpha monitor gas purity detector decay with time because of the blocking action of these gases upon alpha particles.

Once the fuel pins 23 have been properly inspected within the electrode assembly then they are lowered by the pin lifting and electrode operating means into the down position shown in FIG. 3A. Electronic control of the alpha monitor then directs the fuel pin in either of two directions. If accepted, the pin is conveyed endwise by second roller assembly 80 and pinch roller set 189 through exit opening 186 in the cover plate assembly 30. If the fuel pin is rejected, then it is transferred from the second roller assembly upward by a second transfer means 64 using a lifting arm assembly 66. The rejected fuel pins 23 then roll down transfer ramp 65 and are received by an associated piece of fuel pin processing equipment mounted adjacent to the outlet side 39 of the alpha monitor internal assembly 31.

This description of a preferred embodiment of the invention has been presented for purposes of illustration and example. It is not intended to be exhaustive or to limit the invention to the precise form disclosed. It is intended that the scope of the invention be defined by the following claims.

We claim:

1. An apparatus for inspecting elongate pins for alpha particle contaminants on the pin exterior surfaces, comprising:
   a framework;
   an electrode assembly mounted on said framework; said electrode assembly comprising a pair of electrode casings mounted for motion between an open position and a closed position; said electrode assembly also including electrode means for detecting emission of alpha particles; and
   means for singularly positioning elongate pins within said electrode assembly said position means further comprising; means for singularly accepting elongate pins positioned adjacent to the apparatus; pin lifting and electrode operating means for lifting and inserting elongate pins between said electrode casings; and means for transferring elongate pins from said means for singularly accepting elongate pins to said pin lifting and electrode operating means;
   whereby emission of alpha particles from the elongate pin is indicated by a change in the electrical charge existing on said electrode means.

2. The apparatus of claim 1 wherein said electrode casings are semicylindrical and mounted for pivotal motion on the framework, and said electrode means is mounted approximately within the electrode casings so as to be adjacent to an elongate pin positioned within the electrode assembly.

3. An alpha monitor for inspecting nuclear fuel pins for contamination by detecting emission of alpha particles from contaminants present upon the exterior of the pins; comprising;
   a structural framework having an upper beam and lower beam which are spaced apart and approximately parallel, the length of said beams defining a longitudinal direction;
   means for singularly accepting pins positioned laterally adjacent to the alpha monitor;
   an electrode assembly mounted beneath the upper beam; the electrode assembly having two tubular semicylindrical electrode casings each pivotally mounted to produce clamshell movement between a closed position and an open position wherein the electrode casings define a downwardly facing opening through which pins are inserted thereinto;
   a combined pin lifting and electrode operating means connected to the lower beam for lifting and inserting pins between the two electrode casings thereby allowing inspection of the pins therein; and
   first transfer means connected to the lower beam for transferring pins accepted by the means for singularly accepting pins, the first transfer means transferring pins into position for lifting by the combined pin lifting and electrode operating means.

4. The alpha monitor of claim 3 wherein the combined fuel pin lifting and electrode operating means comprises a plurality of lifter units having pin lifters slidably mounted therein, the pin lifters having a lifting head at a distal end with a pin recess for holding elongate pins therein;
   the pin lifters also having an external caming profile which is small at the distal end and then enlarges downwardly to form an enlarged midsection for engaging and opening the electrode assembly in a clamshell type motion, the external caming profile further defined by having a waist downwardly from the enlarged midsection to allow the semicylindrical electrode casings to close about the elongate pin when inserted therein.

5. The alpha monitor of claim 4 wherein the pin lifters are actuated by a plurality of cams.

6. The alpha monitor of claim 4 wherein the combined pin lifting and electrode operating means further comprises biasing means for biasing the lifting pins downwardly.

7. The alpha monitor of claim 3 wherein the two electrode casings are biased into a closed position.

8. The alpha monitor of claim 3 further comprising a first roller assembly connected to the lower beam for receiving pins accepted by the means for singularly accepting pins, the first roller assembly being arranged to roll pins longitudinally to and from the alpha monitor for processing outside the alpha monitor prior to inspection by the alpha monitor.

9. The alpha monitor of claim 3 wherein the first transfer means comprises a plurality of first lifting arms mounted for lifting pins from the first roller assembly; and a plurality of first transfer ramps receiving pins from the lifting arms and from whence the pins roll laterally into position for lifting by the combined pin lifting and electrode operating means.

10. The alpha monitor of claim 3 further comprising a second roller assembly connected to the lower beam and approximately aligned with the combined pin lifting and electrode operating means, for receiving pins and conveying accepted pins longitudinally from the alpha monitor.

11. The alpha monitor of claim 3 wherein:

the first transfer means comprises a plurality of first lifting arms which lift pins from the first roller assembly and roll the pins onto a plurality of first transfer ramps from whence the pins roll laterally into position for lifting by the combined pin lifting and electrode operating means; and further comprising:

a first roller assembly connected to the lower beam for receiving pins accepted by the means for singularly accepting pins, the first roller assembly being arranged to roll pins longitudinally to and from the alpha monitor for processing outside the alpha monitor;

a second roller assembly connected to the lower beam and approximately aligned with the combined pin lifting and electrode operating means, for receiving pins and conveying accepted pins longitudinally from the alpha monitor; and second transfer means comprises a plurality of second lifting arms which lift pins from the combined pin lifting and electrode operating means and roll pins onto a plurality of second transfer ramps from whence the pins roll laterally to exit from the alpha monitor.

12. The alpha monitor of claim 3 wherein the means for singularly accepting pins comprises:

a plurality of singulator cylinders pivotally mounted on the alpha monitor and interconnected by at least one shaft, each of the singulator cylinders having at least one pin recess formed longitudinally along with exterior thereof to receive pins therein; the pin recesses of all singulator cylinders being approximately aligned to receive a single pin simultaneously; and means for pivotally moving the singulator cylinders.

13. The alpha monitor of claim 3 further comprising rollable mounting means for movably supporting portions of the alpha monitor for movement into and from an airtight enclosure.

14. The alpha monitor of claim 13 wherein the rollable mounting means comprises a plurality of mounting rollers rotatably mounted upon the alpha monitor and adapted to ride upon mounting rails mounted in the airtight enclosure.

15. An alpha monitor for inspecting nuclear fuel pins for contamination by detecting emission of alpha particles from contaminants present upon exterior surfaces of a fuel pin casing after the casing has been sealed; comprising:

a structural framework having an upper beam and lower beam which are spaced apart and approximately parallel, with the length of the beams defining a longitudinal direction; the structural framework further having front and rear end pieces connecting the upper and lower beams in fixed relationship;

means for singularly accepting fuel pins positioned laterally adjacent to the alpha monitor; the means for singularly accepting fuel pins having a plurality of singulator cylinders mounted for rotation, the singulator cylinders each having a fuel pin recess on an exterior surface thereof which aligns with associated fuel pin recesses on other singulator cylinders; the means for singularly accepting fuel pins further having means for rotating the singulator cylinders to thereby transfer fuel pins into the alpha monitor one at a time;

a first roller assembly connected to the lower beam for receiving fuel pins accepted by the means for singularly accepting fuel pins, the first roller assembly being arranged to roll fuel pins longitudinally to and from the alpha monitor for processing outside the alpha monitor; the first roller asembly including a plurality of first rollers and means for rotating the rollers to thereby convey the fuel pins longitudinally to and from the alpha monitor;

first transfer means connected to the lower beam and comprising a plurality of first lifting arm assemblies and a plurality of first transfer ramps; the lifting arm assemblies acting to lift fuel pins from the first roller assembly causing the fuel pins to roll laterally onto and over the first transfer ramps;

an electrode assembly mounted beneath the upper beam, the electrode assembly having two tubular semicylindrical electrode casings each pivotally mounted for clamshell movement between a closed position and open positions wherein the electrode casings open downwardly toward the lower beam; the electrode assembly further having a plurality of electrodes mounted within the electrode casings;

a combined pin lifting and electrode operating means connected to the lower beam and comprising a plurality of lifter units having pin lifters slidably mounted therein for extension into the electrode assembly, the pin lifters having a distal end with a recess for receiving and holding fuel pins therein; the pin lifters also having an external camming profile which is narrow at the distal end and then enlarges downwardly to form an enlarged midsection for engaging and opening the pivotally mounted electrode casings in clamshell motion, the external camming profile further defined by tapering inwardly downward from the enlarged midsection to form a waist which allows the electrode casings to close about a fuel pin which is inserted therein;

a second roller assembly connected to the lower beam and approximately aligned with the pin lifters of the combined pin lifting and electrode operating means, the second roller assembly receiving fuel pins when the pin lifters lower to thereby rest the fuel pins in the second roller assembly; the second roller assembly including a plurality of rollers and means for rotating the rollers to thereby convey fuel pins from the alpha monitor longitudinally; and second transfer means connected to the lower beam and comprising a plurality of second lifting arm assemblies, and a plurality of second transfer ramps; the lifting arm assemblies acting to lift fuel pins from the second roller assembly thereby causing the fuel pins to roll laterally therefrom and onto and over the second transfer ramps to thereby exit from the alpha monitor.

16. The alpha monitor of claim 15 wherein the second roller assembly conveys accepted fuel pins longitudinally from the alpha monitor and the second transfer means transfers rejected fuel pins laterally from the alpha monitor for further processing.

* * * * *